United States Patent
Kitani et al.

(10) Patent No.: US 7,305,088 B2
(45) Date of Patent: Dec. 4, 2007

(54) VIDEO DISTRIBUTION PLAYBACK METHOD, APPARATUS TO BE DISPOSED ON VIDEO DISTRIBUTION END, APPARATUS TO BE DISPOSED ON VIDEO PLAYBACK END, COMPUTER READABLE MEDIUM, AND MOVIE DISTRIBUTION METHOD

(75) Inventors: Hajime Kitani, Hamamatsu (JP); Takuya Tamaru, Hamamatsu (JP); Shigetomo Nakamura, Hamamatsu (JP)

(73) Assignee: Yamaha Corporation, Tokyo (JP)

( * ) Notice: Subject to any disclaimer, the term of this patent is extended or adjusted under 35 U.S.C. 154(b) by 838 days.

(21) Appl. No.: 09/796,790

(22) Filed: Mar. 2, 2001

(65) Prior Publication Data

US 2001/0019612 A1 Sep. 6, 2001

(30) Foreign Application Priority Data

Mar. 3, 2000 (JP) .......................... P2000-059358
Jul. 25, 2000 (JP) .......................... P2000-224390

(51) Int. Cl.
*H04N 7/167* (2006.01)
(52) U.S. Cl. ...................... 380/210; 380/200; 380/201; 380/216; 380/218; 705/50; 705/51; 705/57; 352/59; 352/62; 353/25; 386/12; 386/66; 386/94
(58) Field of Classification Search ................ 380/216, 380/201, 210, 218; 705/1, 50, 51, 57; 352/57, 352/62; 353/25; 386/12, 66, 94; 726/31; 348/521, 525, 744
See application file for complete search history.

(56) References Cited

U.S. PATENT DOCUMENTS

| 5,381,476 | A | * | 1/1995 | Kimoto et al. | ............... | 380/201 |
| 5,924,013 | A | * | 7/1999 | Guido et al. | .................. | 725/67 |
| 5,959,717 | A | * | 9/1999 | Chaum | ......................... | 352/40 |
| 6,169,877 | B1 | * | 1/2001 | Gulla' | ......................... | 725/63 |

(Continued)

FOREIGN PATENT DOCUMENTS

JP 60-247682 5/1984

(Continued)

*Primary Examiner*—Kim Vu
*Assistant Examiner*—Beemnet W Dada
(74) *Attorney, Agent, or Firm*—Reed Smith L.L.P.; Stanley P. Fisher, Esq.; Juan Carlos A. Marquez, Esq.

(57) ABSTRACT

A motion-picture distributor (12) uses a computer system (22) to convert video signals from a master film (14) into serial video data (41) complying with DVD-Video standards. Further, the computer system (22) modifies the sequence of scene-data sets (42-1, 42-2, . . . ) constituting the data (41) and encrypts the data for each scene-data set, thus producing encrypted non-serial video data (45). The data (45) are separated into DVD-ROMs (15-1, 15-2, . . . ), for distribution purposes. A theater (13) then uses a serialization apparatus (51) to read the data (45) from the DVD-ROMs (15-1, 15-2, . . . ), and sorts the scene-data sets in a correct sequence, thus producing encrypted serial video data (80). A motion picture projector (52) decrypts the data (80), thereby preparing the data (41). The data (41) are played back to view a movie. On the other hand, a movie distributor (12) may distribute the DVD-ROMs in a separated manner.

6 Claims, 14 Drawing Sheets

U.S. PATENT DOCUMENTS

| | | | |
|---|---|---|---|
| 6,369,859 B1 * | 4/2002 | Watkins | 348/616 |
| 6,507,696 B1 * | 1/2003 | Chung et al. | 386/125 |
| 6,535,687 B1 * | 3/2003 | Tinker et al. | 386/94 |
| 6,633,982 B1 * | 10/2003 | Kurzeja | 713/193 |
| 6,819,459 B2 * | 11/2004 | Poetsch | 358/527 |
| 2001/0013015 A1 * | 8/2001 | Hunter | 705/27 |
| 2002/0003881 A1 * | 1/2002 | Reitmeier et al. | 380/210 |

FOREIGN PATENT DOCUMENTS

| | | |
|---|---|---|
| JP | 60-247683 | 5/1984 |
| JP | 06-253307 | 2/1993 |
| JP | 09-214930 | 1/1996 |
| JP | 08-315053 | 2/1996 |
| JP | 10-145772 | 11/1996 |
| JP | 11-213553 | 1/1998 |
| JP | 11-298846 | 4/1998 |
| JP | 2000-029791 | 7/1998 |
| JP | 11-168663 | 8/1998 |
| JP | 2000-059355 | 8/1998 |
| JP | 11-344926 | 1/1999 |
| WO | WO 97/06637 | 7/1996 |
| WO | WO 99/12350 | 9/1998 |
| WO | WO 99/59335 | 4/1999 |
| WO | WO 00/11870 | 8/1999 |

* cited by examiner

VIDEO DISTRIBUTION PLAYBACK METHOD, APPARATUS TO BE DISPOSED ON VIDEO DISTRIBUTION END, APPARATUS TO BE DISPOSED ON VIDEO PLAYBACK END, COMPUTER READABLE MEDIUM, AND MOVIE DISTRIBUTION METHOD

BACKGROUND OF THE INVENTION

1. Field of the Invention

The present invention relates to a video distribution playback method by which a distributor on the distribution end of the operation duplicates a video product, such as a movie, distributes the duplicate to theaters on the playback end of the operation, and the thus-distributed video product is played back at the theaters. The present invention also relates to an apparatus to be disposed on a video distribution end, an apparatus to be disposed on a video playback end, and a recording medium (such as a computer readable medium), which are to be employed for implementing the method.

The present application is based on Japanese Patent Application Nos. 2000-059358 and 2000-224390, which are incorporated herein by reference.

2. Description of the Related Art

FIG. 19 shows the overall configuration of a related-art motion picture distribution/screening system.

As shown in the drawing, a motion-picture distributor on the distribution end receives a master film of a motion picture produced by a moviemaker. The thus-received master film is then duplicated, as distribution films, equal in number to movie-theaters, which are owned by business partners of the distributor, in which the movie is to be screened (more correctly, equal in the number of screens on which the motion picture is to be screened). The distribution films are distributed to the respective movie theaters. Movie theaters on the playback end play back the thus-distributed distribution films using equipment such as motion-picture projectors. Here, the term "film" signifies a 35 mm optical film (hereinafter simply called a "35 mm film").

Production of a distribution film to be used in the foregoing related-art motion picture distribution/screening system costs 220,000 yen (about US$2,000)/film or thereabouts. For instance, distribution of a single movie to 500 screens costs 110,000,000 yen (about US $1,000,000) or thereabouts. For instance, a movie theater that numbers 100 seats and operates in compliance with the related-art system incurs spending of about 11,000,000 yen (about US $100,000) for equipment costs. Thus, the related-art system imposes a considerably heavy burden on the motion-picture distributor and the movie theaters. This problem remains unavoidable so long as a 35 mm film is used for distributing and screening a movie.

A motion picture distribution/screening system which uses digital media for producing a movie in place of a 35 mm film-has recently been proposed. The system of this type has been put forward for the purpose of completely substituting digital media for a 35 mm film. This system can provide far better screening quality than that yielded by the related-art system. However, ensuring high screening quality involves custom-designed facilities. Thus, a significant curtailment of costs required for distributing a film or costs incurred by facilities of a movie theater is impossible. For this reason, the system of this type has not yet become pervasive.

If general-purpose facilities are used for a motion picture distribution-and-screening system using digital media, significant cost reductions can be expected. However, since general-purpose facilities are used, the chance of third parties being able to realize unauthorized duplication or appreciation of a film becomes higher. Prevention of unauthorized use of a film is indispensable for distributing and screening a film produced at the expense of enormous amounts of money. Particularly, when a movie is distributed and screened as digital data that can be duplicated without involvement of physical deterioration, a need exists for reliably preventing unauthorized use of a film.

SUMMARY OF THE INVENTION

The present invention has been conceived in view of the drawbacks of the related-art systems, and is aimed at providing a video distribution-and-playback method that enables safe distribution and playback of a video product, such as a movie, through use of digital media, yet allows the video product to be protected from unauthorized use. The present invention also provides an apparatus to be disposed on a video distribution end, an apparatus to be disposed on a video playback end, and a computer readable medium.

Furthermore, the present invention is aimed at providing a movie distribution method that enables safe and low-cost distribution of a video product, such as a movie, as well as providing an apparatus to be disposed on the movie distribution end for implementing the method.

To solve the foregoing drawbacks, according to a first aspect of the present invention, there is provided a video distribution playback method which distributes, to the playback end, video data formed by way of sorting a plurality of unit video data sets in time series and which plays back, at the playback end, the video data distributed from the distribution end, the method comprising:

a modification step of modifying, on the distribution end, the sequence of said plurality of unit video data sets constituting said video data;

a distribution step of distributing, from the distribution end to the playback end, said video data sets having said plurality of unit video data sets whose sequence has been modified in the modification step;

a reconstruction step of sorting, on the playback end and in time series, said plurality of unit video data sets constituting said video data distributed in the distribution step; and a playback step of playing back, on the playback end, the video data having said plurality of unit video data sets as sorted in the reconstruction step.

According to a second aspect of the present invention, preferably, the distribution step of the first aspect involves:

distributing and storing, into a plurality of computer readable mediums, said video data sets having said plurality of unit video data sets whose sequence has been modified in the modification step; and delivering said plurality of computer readable mediums from the distribution end to the playback end; and wherein the reconstruction step involves combining said data stored in said plurality of computer readable mediums delivered in said distribution step, thereby producing video data and sorting in time series said plurality of unit video data sets constituting said video data.

According to a third aspect of the present invention, the video distribution playback method of the first aspect further comprises:

an encryption step of encrypting, on the distribution end, video data to be distributed to the distribution end; and a decryption step of decrypting, on the playback end, the video data distributed in the distribution step.

According to a fourth aspect of the present invention, preferably, said encryption step according to the third aspect involves an encrypting operation that is performed through use of an encryption method assigned to the playback end, and said decryption step involves a decrypting operation that is performed through use of said encryption method assigned to the playback end.

Further, according to a fifth aspect of the present invention, in order to implement the method of the first aspect, there is provided an apparatus to be disposed on the video distribution end for implementing the video distribution playback method as defined in the first aspect of the present invention, wherein the apparatus comprises: a modification routine which modifies the sequence of a plurality of unit video data sets constituting video data.

According to a sixth aspect of the present invention, preferably, the apparatus of the fifth aspect further comprises a recording device which distributes and stores, into a plurality of computer readable mediums, said video data sets having said plurality of unit video data sets whose sequence has been modified by the modification routine.

By way of the method and apparatus, video data are delivered while being distributed into a plurality of computer readable mediums.

According to a seventh aspect of the present invention, the apparatus of the fifth aspect further comprises an encryption routine that encrypts video data to be distributed.

According to an eighth aspect of the present invention, preferably, the encryption routine of the seventh aspect performs an encryption operation through use of an encryption method assigned to the playback end.

By way of the method and apparatus, video data to be distributed to the playback end are encrypted in accordance with an encoding method assigned to the playback end.

Moreover, according to a ninth aspect of the present invention, in order to implement the method of the first aspect, there is provided an apparatus, to be disposed on the video playback end for implementing the video distribution playback method as defined in the first aspect of the present invention, wherein the apparatus comprises:
 a serialization apparatus which sorts, in time series, said plurality of unit video data sets constituting said video data distributed from the distribution end; and
 a playback device which plays back the video data having said plurality of unit video data sets as sorted by the serialization apparatus.

According to a tenth aspect of the present invention, the apparatus of the ninth aspect further comprises a decryption routine which decrypts the video data distributed from the distribution end.

By way of the method and apparatus, encrypted video data are distributed.

In order to solve the drawbacks of the related art, according to an eleventh aspect of the present invention, there is also provided an apparatus, to be disposed on the video playback end for implementing a video distribution playback method which distributes encrypted video data from the distribution end to the playback end, and which plays back, at the playback end, the video data distributed from the distribution end, the apparatus comprising:
 a decryption routine which decrypts said video data distributed from the distribution end;
 a reconstruction device which reconstructs said video data that have been decrypted by said decryption routine; and
 a protection device which prohibits outputting said video data that have been decrypted by said decryption routine.

By way of this apparatus, decrypted video data are not output to the outside of the apparatus.

According to a twelfth aspect of the present invention, there is provided a computer readable medium—to be used for implementing the method having recorded thereon video data having a plurality of unit video data sets whose sequence has been changed.

By way of the method, apparatus, and computer readable medium, video data having a plurality of unit video data sets whose sequence has been changed are distributed.

Further, in order to solve the problems of the related art, according to a thirteenth aspect of the present invention, there is provided business method, for distributing a movie from the movie distribution end to a movie theater on which the movie is to be screened, comprising:
 preparing sets of DVD-ROMs (digital versatile disc-read only memory, for example) on the movie distribution end, each set of the DVD-ROMs comprising a plurality of DVD-ROMs, wherein the DVD-ROMs are prepared from a master movie film produced by a movie producer;
 distributing one set of said DVD-ROMs to the theater; and
 screening the movie in the movie theater through use of one set of said DVD-ROMs distributed from the movie distribution end.

Further, according to a fourteenth aspect of the present invention, there is provided an apparatus to be disposed on the distribution end for implementing the method of the thirteenth aspect, the apparatus comprising:
 a film reading device which reads a master movie film, produced by a movie producer, on a per-scene basis, and which outputs an analog video signal pertaining to respective scenes on a per-scene basis; and
 a computer which prepares sets of DVD-ROMs (digital versatile disc-read only memory, for example), each set of the DVD-ROMs comprising a plurality of DVD-ROMS, wherein the DVD-ROMs are prepared by use of said video signal output from said film reading device.

By way of the method and apparatus, the present invention enables safe and low-cost distribution of movie data.

BRIEF DESCRIPTION OF THE DRAWINGS

The above and other objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

Preferred embodiments of the present invention will be described hereinbelow with reference to the accompanying drawings.

Motion picture distribution-and-screening systems, according to embodiments of the present invention, are embodied by way of applying a video distribution-and-screen method according to the present invention to distribution and screening of a movie intended to be screened in a small-scale theater (mini-theater) having 20 to 100 seats.

A: First Embodiment

A motion picture distribution-and-screening system according to a first embodiment of the present invention will be described with reference to FIGS. 1 through 10.

A-1: Overall Configuration

Figure 1:
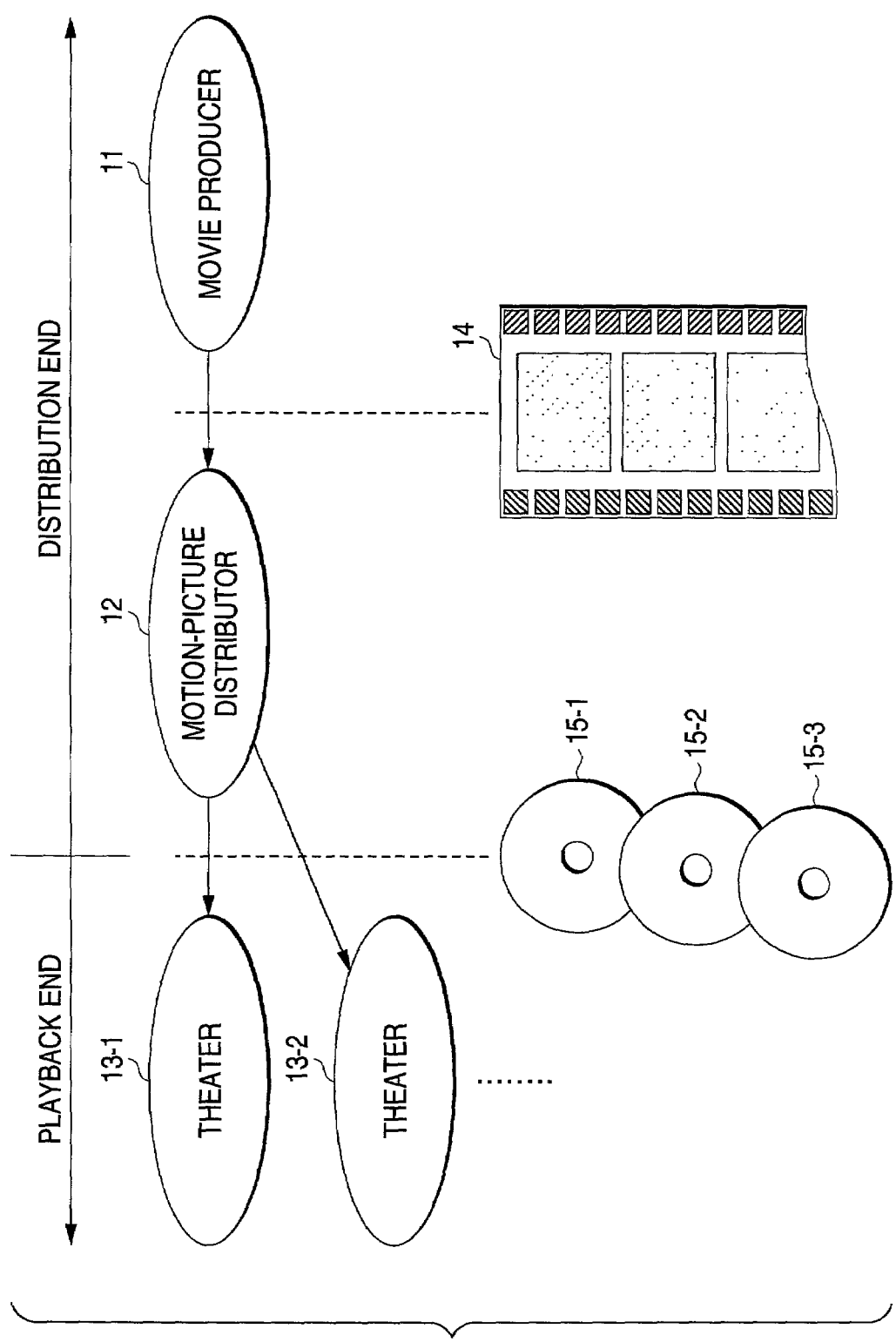
FIG. 1 is a conceptual rendering showing the overall configuration of a motion picture distribution-and-screening system according to a first embodiment of the present invention.

FIG. 1 is a conceptual rendering showing the overall configuration of a motion picture distribution-and-screening system according to a first embodiment of the present invention. As illustrated, on the movie distribution end are a movie producer 11 and a motion-picture distributor 12. On the movie playback end, there are a plurality of theaters 13-1, 13-2, . . . . The movie producer 11 produces a movie and transfers a master film 14 of the thus-produced movie to the motion-picture distributor 12. The motion-picture distributor 12 produces, from the master film 14, a plurality of sets of DVD-ROMs (Digital Versatile Disc-Read Only Memory, for example) for distribution purpose, wherein a single set of DVD-ROMs is produced from a plurality of DVD-ROMs 15-1, 15-2, . . . . The DVD-ROM sets are delivered to respective theaters 13-1, 13-2, . . . , where the movie is to be screened. The movie is screened through use of the thus-delivered DVD-ROMs 15-1, 15-2, . . . .

In the following descriptions, a theater is denoted by 13 unless any one of the theaters 13-1, 13-2, . . . is specified. The same applies to the other reference numerals. In the present embodiment, there is often employed a case where the distribution DVD-ROM 15 is comprised of three DVD-ROMs. However, the number of DVD-ROMs 15 differs from one movie to another and is not limited to the number 3.

A-2: Configuration of Apparatus to be Disposed on the Distribution End

The configuration of an apparatus 20 to be disposed on the part of the motion-picture distributor 12 will now be described with reference to FIGS. 2 through 4.

Figure 2:
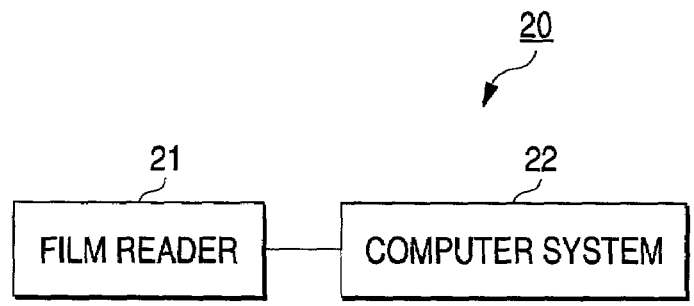
FIG. 2 is a block diagram showing the configuration of an apparatus 20 to be disposed on the distribution end, the apparatus serving as the motion picture distribution-and-screening system.

FIG. 2 is a block diagram showing the configuration of the apparatus 20. As illustrated, the apparatus 20 comprises a film reader 21 and a computer system 22. The film reader 21 reads the master film 14 on a per-scene basis (i.e., a per-unit-video basis), and for each scene outputs an analog video signal (24 frames/sec.) according to the master film 14. Through use of the video signal output from the film reader 21, the computer system 22 produces the DVD-ROMs 15-1, 15-2, . . . .

Figure 3:
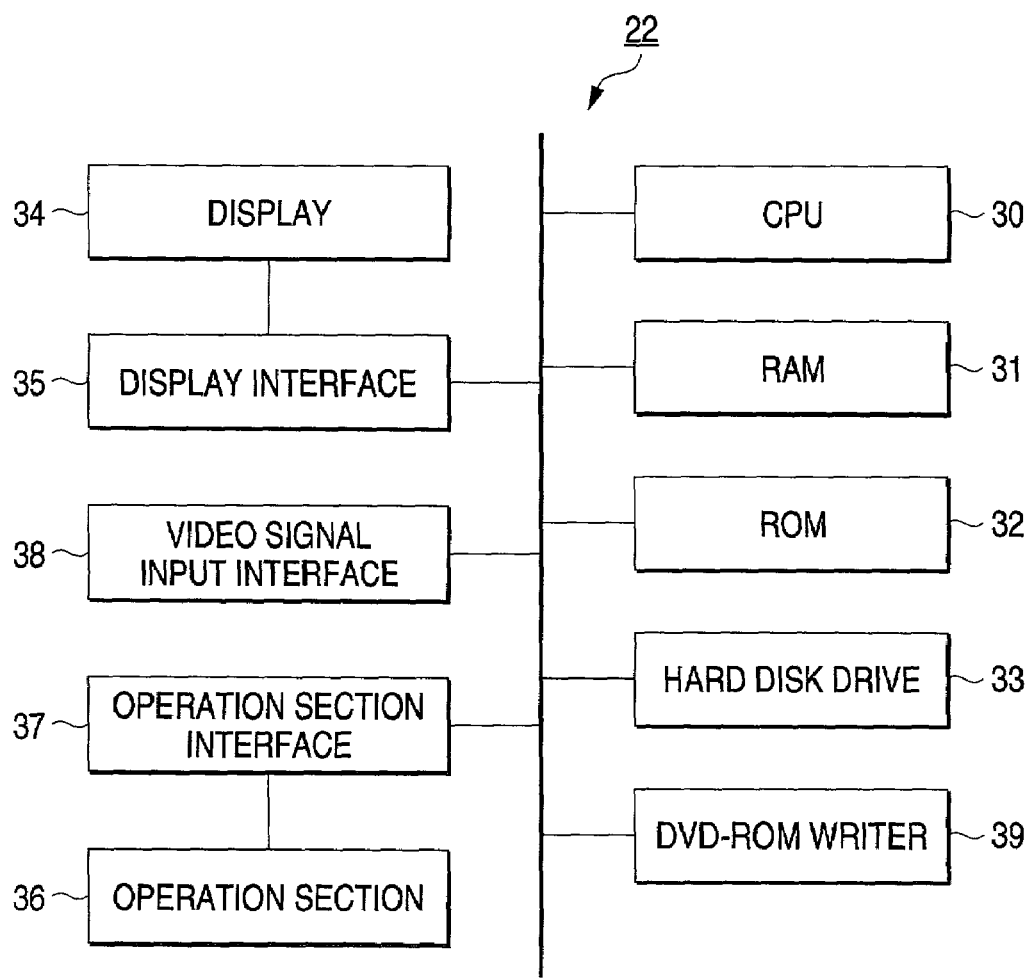
FIG. 3 is a block diagram showing the configuration of the computer system 22 serving as the apparatus 20.

FIG. 3 is a block diagram showing the configuration of the computer system 22. As illustrated, the computer system 22 comprises: a CPU (Central Processing Unit) 30 which performs various types of computations and controls individual sections; RAM (Random Access Memory) 31 to be used as work memory; ROM 32 which stores a cluster of programs to be read and executed by the CPU 30; a hard disk drive 33 which stores a cluster of programs to be read and executed by the CPU 30, such as an operating system and application programs; a display 34, such as a CRT (cathode ray tube), which displays an image to the user; a display interface 35 for displaying, on the display 34, an image corresponding to the data supplied from the CPU 30; an operation section 36, such as a keyboard or a mouse, by way of which the user enters an instruction; an operation-section interface 37 which supplies to the CPU 30 data representing the instruction entered by way of the operation section 36; a video-signal input interface 38 which digitizes a video signal output from the film reader 21 and supplies the thus-digitized video signal to the CPU 30; and a DVD-ROM writer 39 which is controlled by the CPU 30 and writes the data onto a DVD-ROM loaded therein. The hard disk unit 33 is read and written by the CPU 30 and is used for storing various types of video data sets.

As a result of turning on the power (unillustrated), or in accordance with the user instruction entered by way of the operation section 36, the CPU 30 executes a cluster of programs stored in the ROM 32 and the hard disk drive 33, thereby performing processing for producing DVD-ROMs 15-1, 15-2, . . . . The function of the computer system 22 will be described with particular attention to the processing.

Figure 4:
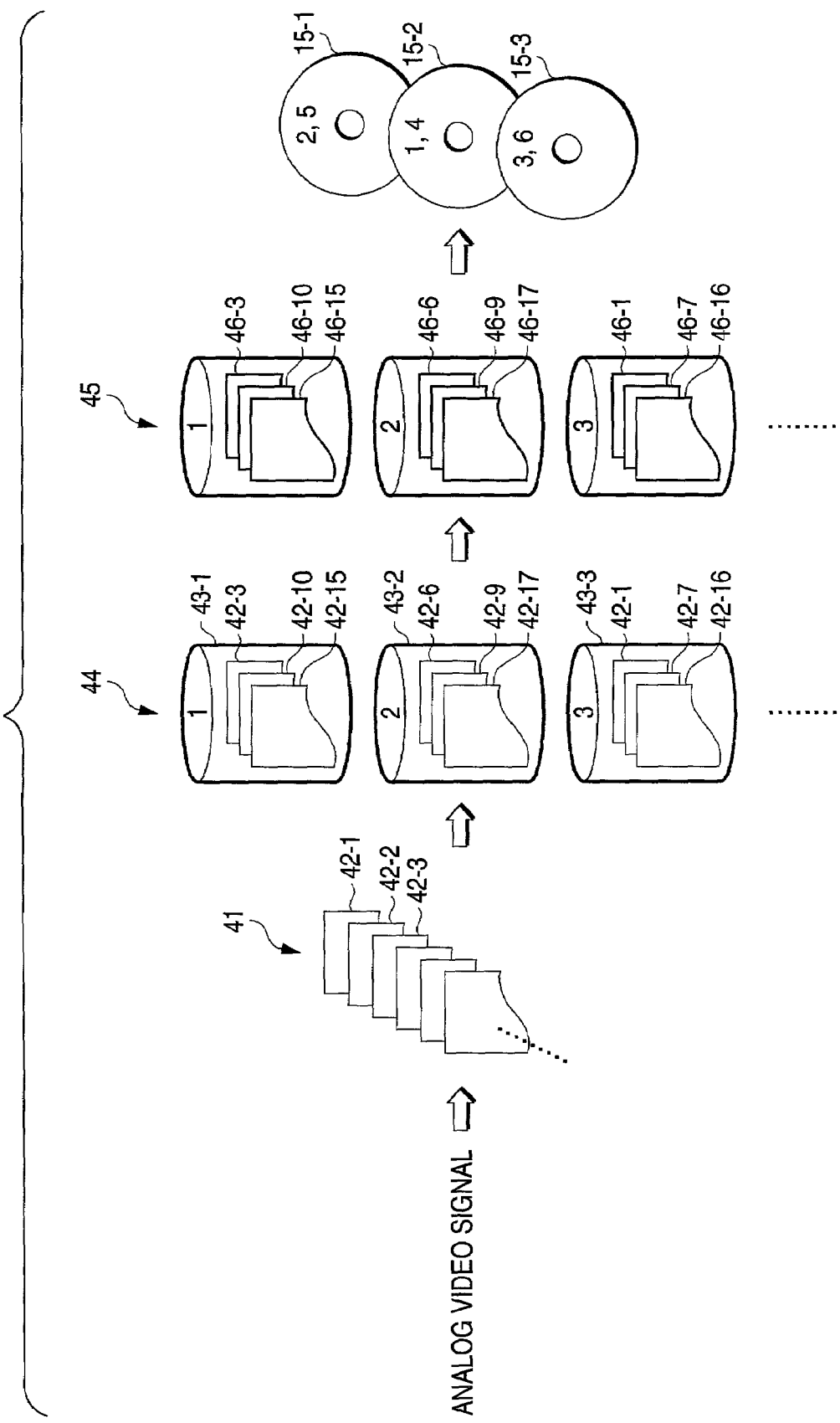
FIG. 4 is a conceptual rendering showing processes of producing the DVD-ROMs 15-1, 15-2, . . . in the computer system 22.

FIG. 4 is a conceptual rendering showing processes of producing the DVD-ROMs 15-1, 15-2, . . . in the computer system 22. As illustrated, the video signal input interface 38 of the computer system 22 produces serial video data 41 by means of digitizing an analog video signal output from the film reader 21. The thus-produced video signal is supplied to the CPU 30. The serial video data 41 is comprised of scene data sets 42-1, 42-2, ... which are video data pertaining to respective scenes in a movie and are arranged in the sequence of playback. The serial video data 41 comply with the DVD-Video standards (60 frames/sec.).

The CPU 30 stores, in the hard disk drive 33, the serial video data 41 supplied from the video signal input interface 38, thereby producing non-serial video data 44 in which the scene data sets 42-1, 42-2, ... are randomly distributed to units 431, 43-2, .... In this case, the CPU 30 assigns serial numbers to the respective units 43 (e.g., 1, 2, ... to identify the units 43-1, 43-2, ... ). Further, the CPU 30 encrypts the non-serial video data 44 for each scene data set 42 by way of a contents scramble system (CSS) specified by the DVD-Video standards, thereby producing encrypted non-serial video data 45 comprised of encrypted scene data sets 46-1, 46-2, ....

The CPU 30 displays, on the display 34 and by way of the display interface 35, an image for prompting insertion of a first DVD-ROM into the DVD-ROM writer 39. When an appropriate DVD-ROM is inserted into the DVD-ROM writer 39, a plurality of units randomly extracted from all the units 43-1, 43-2, ... are written into the DVD-ROM. The CPU 30 subjects the second DVD-ROM, the third DVD-ROM, ... to the same processing as that to which the first DVD-ROM has been subjected, thereby producing the DVD-ROMs 15-1, 15-2, .... Here, the CPU 30 writes each of the units 43 into DVD-ROMs only once. In short, all the units 43-1, 43-2, ... are distributed and recorded into the DVD-ROMs 15-1, 15-2, ... without overlap. The CPU 30 has the function of repeatedly producing the DVD-ROMs 15-1, 15-2, ... in the number of sets specified by the user.

A-3: Configuration of the Apparatus to be Disposed on the Playback End

Referring to FIGS. 5 through 8, next will be described the configuration of an apparatus 50 to be disposed in the theater 13 on the playback end.

Figure 5:
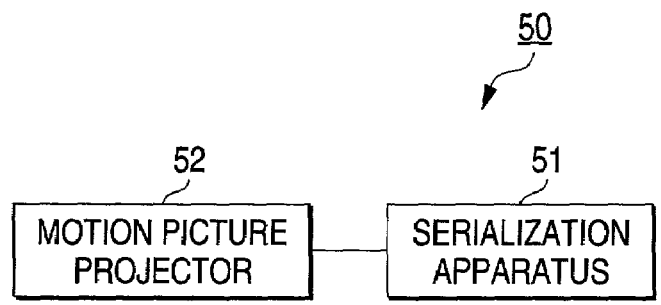
FIG. 5 is a block diagram showing the configuration of an apparatus 50 to be disposed on the playback end, the apparatus serving as the motion picture distribution-and-screening system.

FIG. 5 is a block diagram showing the configuration of the apparatus 50. As illustrated, the apparatus 50 comprises a serialization apparatus 51 and a motion picture projector 52.

The apparatus 50 is embodied by interconnecting the serialization apparatus 51 and the motion picture projector 52.

Figure 6:
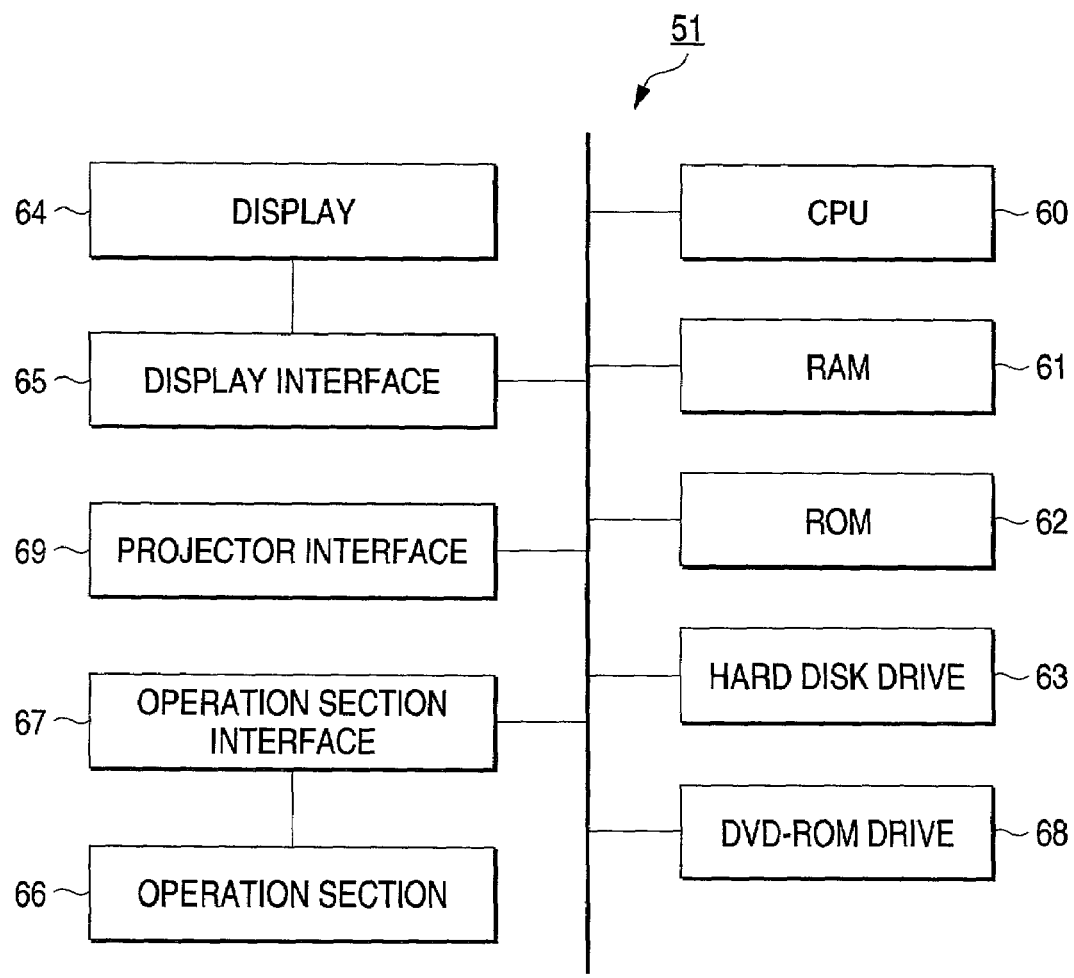
FIG. 6 is a block diagram showing the configuration of a serialization apparatus 51 serving as the apparatus 50.

FIG. 6 is a block diagram showing the configuration of the serialization apparatus 51.

As illustrated, the serialization apparatus 51 comprises: a CPU 60, which performs computations and controls individual sections; RAM 61 to be used as work memory for the CPU 60; ROM 62 for storing programs to be read and executed by the CPU 60; a hard disk drive 63 to be read and written by the CPU 60; a display 64, such as a liquid-crystal display, which displays an image to the user; a display interface 65 which displays, on the display 64, an image corresponding to the data supplied from the CPU 60; an operation section 66, such as an operation button, by way of which the user enters an instruction; an operation section interface 67 for supplying, to the CPU 60, the data which represent the instruction entered by way of the operation section 66; a DVD-ROM drive 68, which is controlled by the CPU 60, and which reads data from a DVD-ROM loaded therein; and an interface 69, for use with a motion picture projector, which outputs to the motion picture projector 52 the data (i.e., digital video data or instruction) output from the CPU 60.

Figure 7:
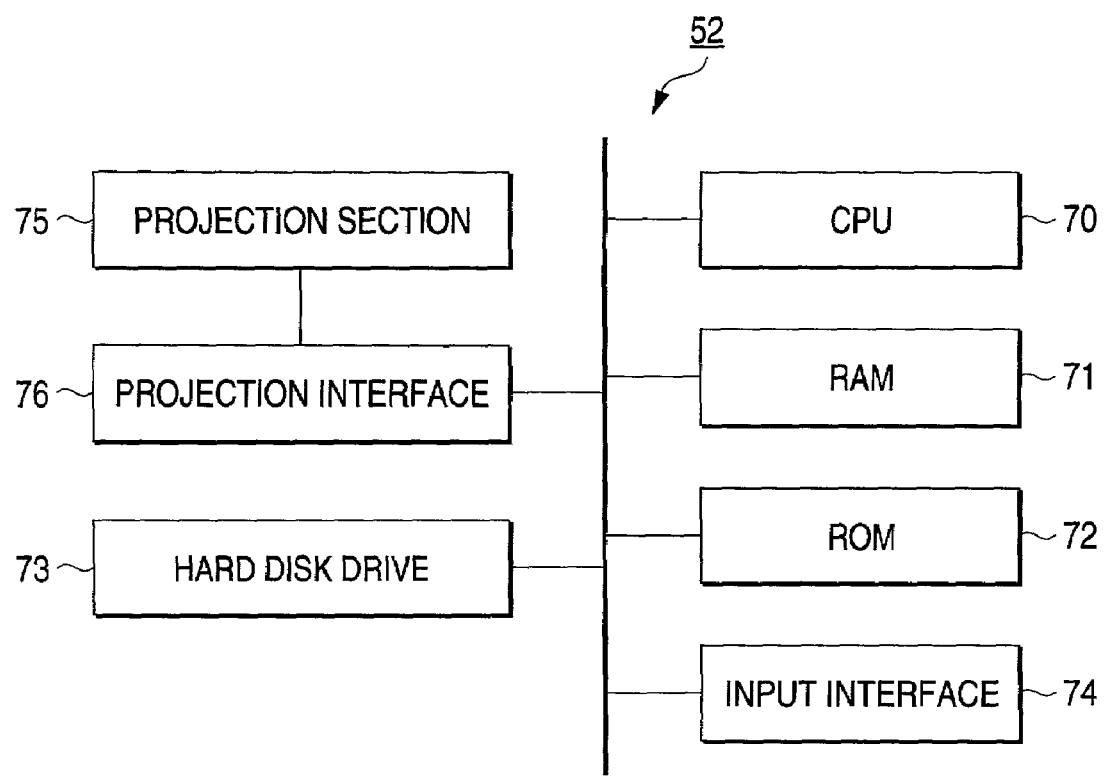
FIG. 7 is a block diagram showing the configuration of a motion picture projector 52 serving as the apparatus 50.

FIG. 7 is a block diagram showing the configuration of the motion picture projector 52. As illustrated, the motion picture projector 52 further comprises: a CPU 70, which performs various computations and controls individual sections; RAM 71 to be used as work memory for the CPU 70; ROM 72 for storing programs to be read and executed by the CPU 70; a hard disk drive 73 to be read and written by the CPU 70; a motion picture projection section 75 for projecting a movie; a projection interface 76 which optimizes a video corresponding to the video data (60 frames/sec.) output from the CPU 70 (i.e., converts the video to 24 frames/sec.) and causes the motion picture projection section 75 to project a movie; and an input interface 74 which inputs the data output from the serialization apparatus 51.

The serialization apparatus 51 is configured such that the CPU 60 executes a program stored in the ROM 32 as a result of turning on power (unillustrated), or in accordance with the user instruction entered by way of the operation section 36, thereby performing processing for producing, from the DVD-ROMs 15-1, 15-2, ..., video data capable of being screened by the motion picture projector 52. Further, the motion picture projector 52 is configured such that the CPU 70 performs processing for screening a video corresponding to the input video data, by way of executing a program stored in the CD-ROM 72, as a result of turning on a power control (unillustrated), or in accordance with the instruction output from the serialization apparatus 51.

The function of the serialization apparatus 51, and that of the motion picture projector 52, will be described with particular attention to the processing.

Figure 8:
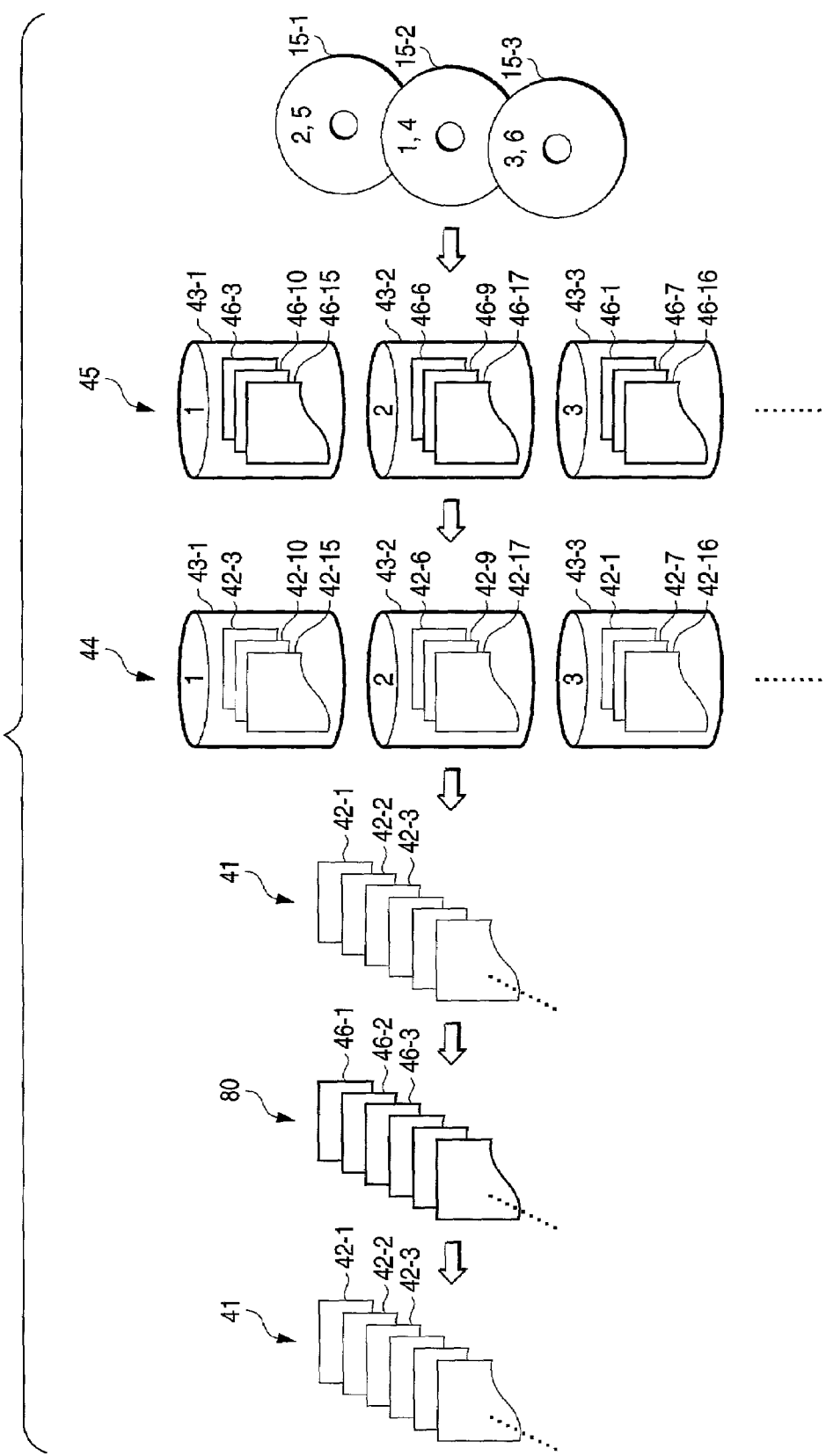
FIG. 8 is a conceptual rendering showing processes for playing back, on the playback end of the motion picture distribution-and-screening system, the data stored in the DVD-ROMs 15-1 to 15-3.

FIG. 8 is a conceptual rendering showing processes for playing back, on the playback end, the data stored in the DVD-ROMs 15-1 to 15-3. As illustrated, the CPU 60 of the serialization apparatus 51 displays, on the display 64 and by way of the display interface 65, an image for prompting insertion of the first DVD-ROM 15-1 into the DVD-ROM drive 68. When the DVD-ROM 15-1 is inserted into the DVD-ROM drive 68, the units 43 stored in the DVD-ROM 15-1 (e.g., the units 43-1 and 43-2) are read, and the thus-read units are stored in the hard disk drive 63. The CPU 60 subjects the second DVD-ROM, the third DVD-ROM, ... to the same processing as that to which the first DVD-ROM 15 has been subjected, thereby storing all the units 43-1, 43-2, ... into the hard disk drive 63.

For each of the scene data sets 46, the CPU 60 decrypts the encrypted non-serial video data 45 comprised of the scene data 46-1, 46-2, ... belonging to all the units 43-1, 43-2, ..., by means of the CSS, thus producing the non-serial video data 44. The CPU 60 sorts the scene data 42-1, 42-2, ... provided in the non-serial video data 44 in the correct sequence in accordance with preset procedures. The CPU 60 encrypts the serial video data 41 for each of the scene data sets 42 by means of the CSS, thus producing encrypted serial video data 80. The thus-encrypted serial video data 80 are output to the motion picture projector 52 by way of the projector interface 69. Here, the encrypted serial video data 80 correspond to the scene data 46-1, 46-2, ..., sorted in the correct sequence of playback.

Upon receipt of the encrypted serial video data 80 by way of the input interface 74, the CPU 70 of the motion picture projector 52 stores the video data 80 into the hard disk drive 73. The CPU 70 decrypts the scene data 46-1, 46-2, ... constituting the encrypted serial video data 80 stored in the hard disk drive 73, by means of the CSS, thus preparing the serial video data 41. The motion picture projector 52 is configured so as not to permit outputting of video data. When the motion picture projector 52 is disassembled, the data stored in the hard disk drive 73 are erased.

Upon receipt of a predetermined instruction from the operation section 66, the CPU 60 of the serialization apparatus 51 outputs a screening start instruction to the motion picture projector 52 by way of the projector interface 69. Upon receipt of a screening start instruction by way of the input interface 74, the CPU 70 of the motion picture projector 52 activates the motion picture projection section 75 and the projection interface 76, thereby supplying the serial video data 41 to the projection interface 76. Taking the screening start instruction output from the serialization apparatus 51 as a trigger, the motion picture projector 52 starts playing back (i.e., screening) the serial video data 41 stored in the hard disk drive 73.

A-4: Flow of Processes for Distributing and Screening a Movie

Figure 9:
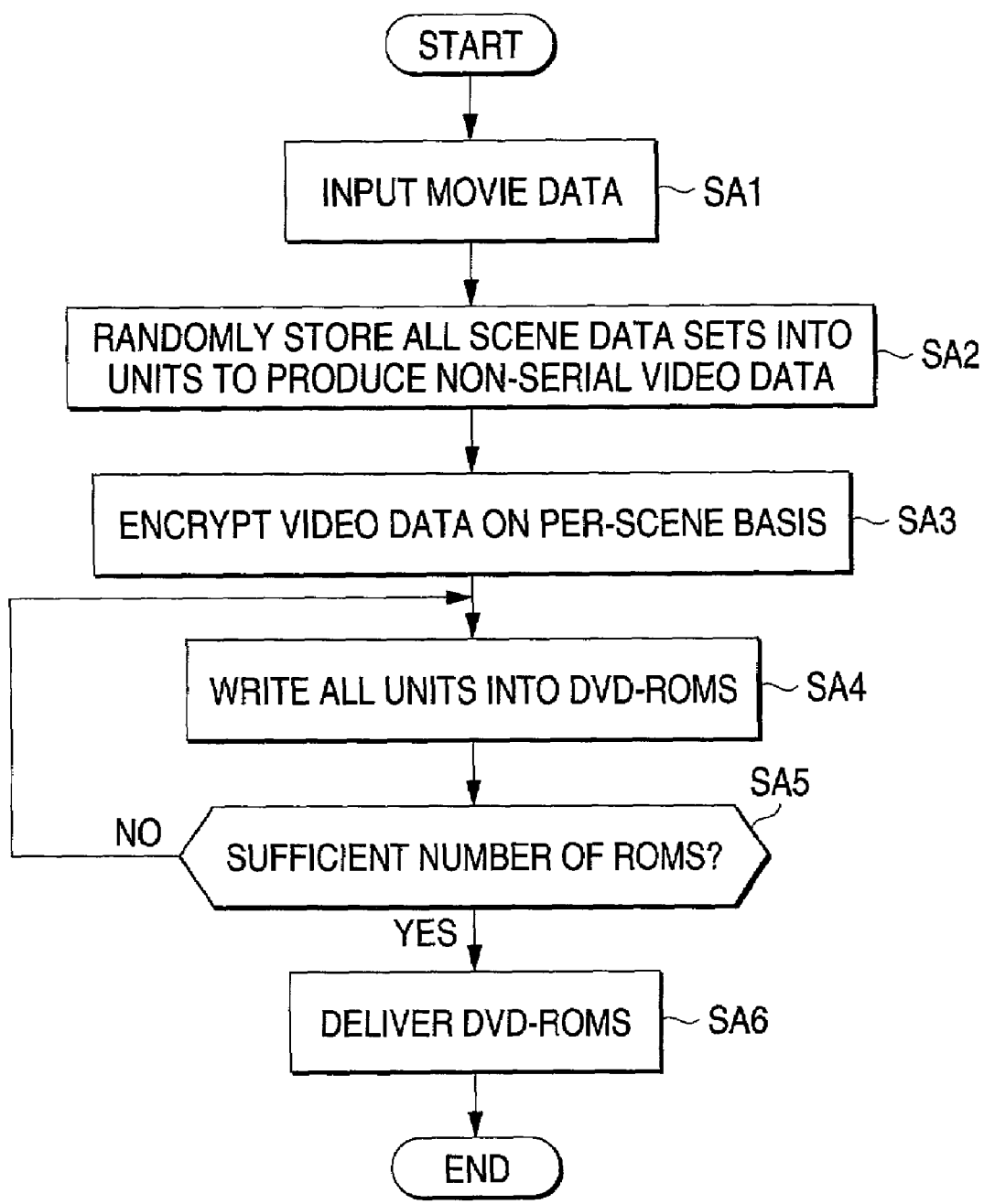
FIG. 9 is a flowchart showing the flow of distribution operation to be performed by the distribution end of the motion picture distribution-and-screening system.
Figure 10:
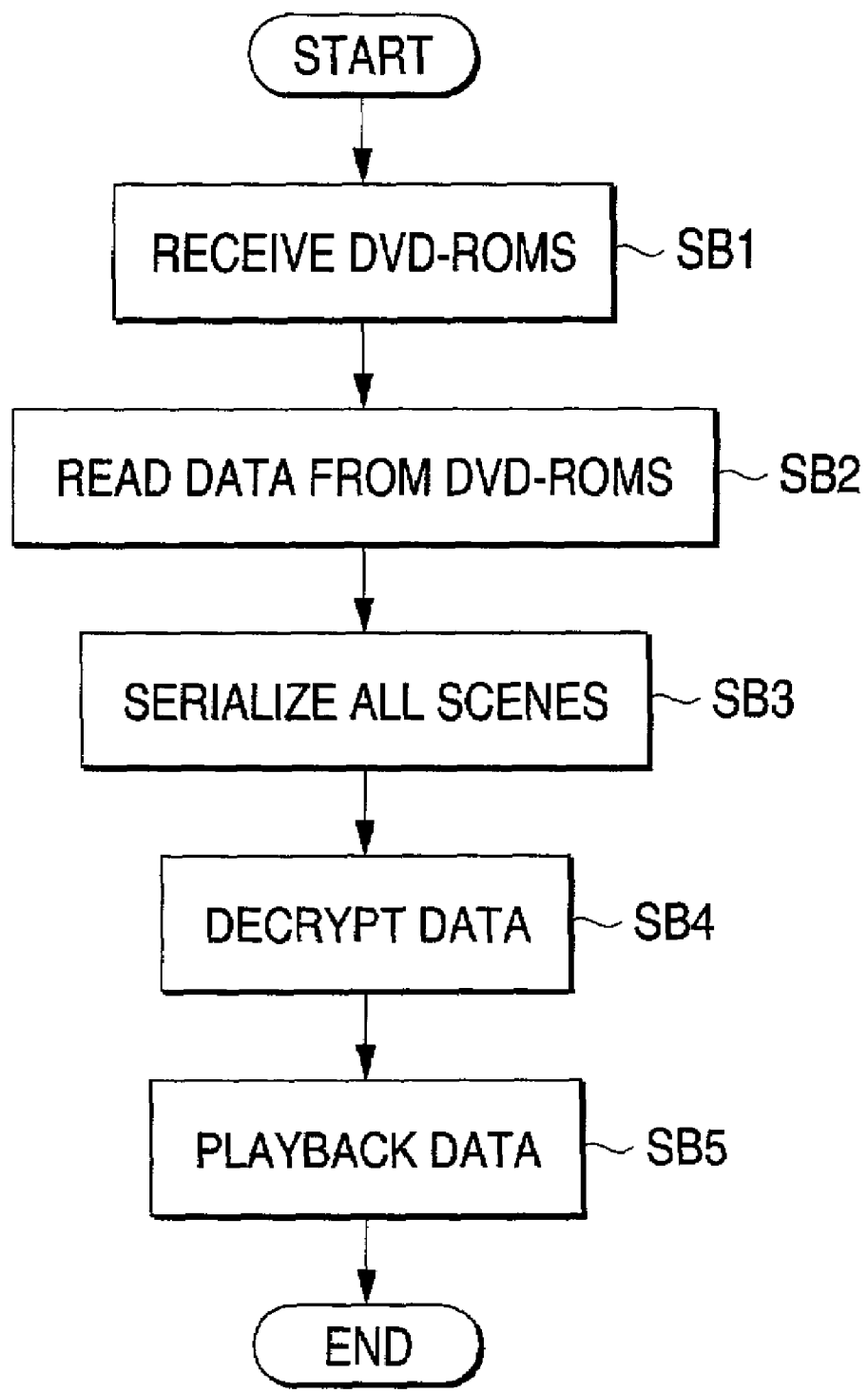
FIG. 10 is a flowchart showing the flow of the playback operation to be performed by the playback end of the motion picture distribution-and-screening system.

Referring primarily to FIGS. 9 and 10, next will be described the flow of processes for distributing and screening a movie on the motion picture distribution-and-screening system of the foregoing construction. The following descriptions are based on the assumption that the power of the film reader 21, that of the computer system 22, that of the serialization apparatus 51, and that of the motion picture projector 52 have already been turned on. Further, the following descriptions are based on the assumption that the serialization apparatus 51 has already sorted the scene data sets 46-1, 46-2, in the correct sequence of projection.

FIG. 9 is a flowchart showing the flow of the distribution operation to be performed by the distribution end. As illustrated, upon receipt of the master film 14 from the movie producer 11, the operator of the motion-picture distributor 12 causes the film reader 21 to read the master film 14. As shown in FIG. 4, an analog video signal corresponding to the master film 14 is input to the computer system 22, where the video signal is converted into a digital signal (step SA1). The master film 14 is read on a per-scene basis. For this reason, the serial video data 41, formed by means of sequentially arranging the scene data 42-1, 42-2, . . . , which data correspond to digital image signals pertaining to respective scenes in a movie, are stored in the hard disk 33 of the computer system 22.

The computer system 22 produces non-serial video data 44 comprised of the units 43-1, 43-2, . . . , wherein all the scene data sets 42-1, 42-2, . . . are stored randomly in the units 43-1, 43-2, . . . without overlap (step SA2). The computer system 22 encrypts the scene data 42-1, 42-2, . . . included in the non-serial video data 44, by way of the CSS thereby producing encrypted non-serial video data 45 (step SA3).

The thus-prepared non-serial video data 45 are randomly written into a DVD-ROM for each unit 43. Only one set of the DVD-ROMs (15-1, 15-2, . . . ) is prepared (step SA4). Processing pertaining to step SA4 is repeated by the number of theaters 13 on which a movie is to be screened (step SA5). When setting of the number of theaters 13 on which a movie is to be screened is completed, the user delivers the DVD-ROM sets to the respective theaters 13 (step SA6).

FIG. 10 is a flowchart showing the flow of playback operation to be performed by the playback end of the operation. As illustrated, when the theater 13 has received the DVD-ROMs 15-1, 15-2, . . . from the motion-picture distributor 12 (step SB1), the operator of the theater 13 causes the serialization apparatus 51 to read the DVD-ROMs 15-1, 15-2, . . . , by way of actuation of the serialization apparatus 51 (step SB2). The encrypted non-serial video data 45 are stored in the hard disk 63 provided in the serialization apparatus 51.

In the serialization apparatus 51, all the scene data sets 46-1, 46-2, . . . constituting the encrypted non-serial video data 45 stored in the hard disk drive 63 are decrypted, thereby producing the non-serial video data 44. Further, all the scene data sets 42-1, 42-2, . . . constituting the non-serial video data 44 are sorted into an appropriate sequence in accordance with preset procedures, thus producing the serial video data 41. The serial video data 41 are encrypted for each of the scene data sets 42-1, 42-2, . . . , whereby the encrypted serial video data 80 are produced (step SB3). The encrypted serial video data 80 are supplied to the motion picture projector 52.

In the motion picture projector 52, all the scene data sets 46-1, 46-2, . . . constituting the encrypted serial video data 80 are decrypted, whereby the serial video data 41 are prepared (step SB4). When the user enters a screening start instruction by way of the serialization apparatus 51, the motion picture projector 52 plays back the serial video data 41 (step SB5). Consequently, video-corresponding to the serial video data 41 output from the motion picture projection section of the motion picture projector 52-is projected, whereby a movie is screened.

A-5: Supplement

As mentioned above, according to the present embodiment, the video data, which are stored in the DVD-ROMs 15-1, 15-2, . . . to be delivered to the theater 13 from the motion-picture distributor 12, are sorted randomly on a per-scene basis and also are encrypted on a per-scene basis. Even if a portion of the DVD-ROMs 15-1, 15-2, . . . or all the DVD-ROMs are stolen by third parties, the third parties who do not have the authorized apparatus 50 cannot play back data properly. In other words, unauthorized viewing of a movie can be prevented.

Figure 11:
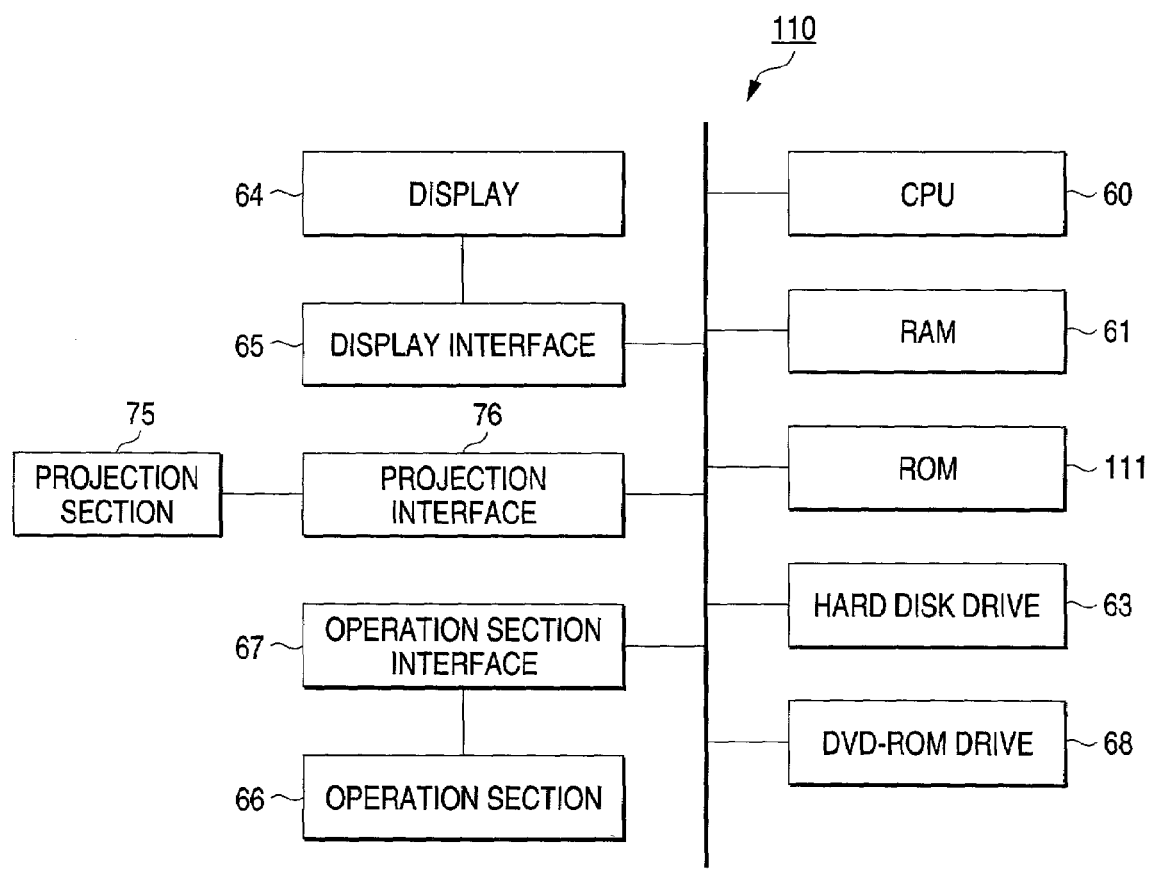
FIG. 11 is a block diagram showing the configuration of an apparatus 110 to be disposed on the playback end of the operation, wherein the apparatus 110 is formed by integrating the serialization apparatus 51 and the motion picture projector 52.

In the present embodiment, the serialization apparatus 51 does not output decrypted video data. Hence, even if the third parties own the authorized apparatus 50, they cannot duplicate the serial video data 41. In other words, unauthorized duplication of a movie can be prevented. In the present embodiment, the serialization apparatus 51 is separated from the motion picture projector 52. As shown in FIG. 11, however, they may be integrated into a single unit. FIG. 11 is a block diagram showing the configuration of an apparatus 110 to be disposed on the playback end of the operation. The apparatus 110 is formed by way of integrating the serialization apparatus 51 and the motion picture projector 52. In FIG. 11, those elements which are identical with the elements shown in FIGS. 6 and 7 are assigned the same reference numerals. In the drawing, ROM 111 is the only newly provided element, wherein ROM 111 stores the programs that were stored in the ROM 62 and the programs that were stored in the ROM 72. As is evident from the foregoing description, the apparatus 110 functions as both the serialization apparatus 51 and the motion picture projector 52. The apparatus 110 is configured so as to prevent outputting of video data to the outside, as in the case of the motion picture projector 52. As mentioned above, so long as the serialization apparatus 51 and the motion picture projector 52 are integrated together, unauthorized duplication of a movie can be prevented more reliably.

In the present embodiment, one set of DVD-ROMs 15 (i.e., one or more DVD-ROMs) is distributed. Hence, even if a portion of the DVD-ROMs is stolen by third parties, they cannot view a movie. Unauthorized viewing of a movie thus can be prevented more reliably. If the DVD-ROMs 15 constituting a set are delivered separately from each other, unauthorized viewing of the movie can be prevented more reliably. The foregoing embodiment has illustrated an example in which the movie producer 11 passes the master film 14 to the motion-picture distributor 12. However, it goes without saying that the movie producer 11 may pass the serial video data 41 to the motion-picture distributor 12.

In this embodiment, a single encryption method using the CSS has been applied to the DVD-ROMs 151, 15-2, . . . to be delivered to the theaters 13. The theaters 13 can employ a common encryption method. Hence, costs for manufacturing the serialization apparatus 51 and the motion picture projector 52 can be reduced. Conversely, another conceivable method is to change a method of encrypting the DVD-ROMs 15-1, 15-2, . . . from one theater to another. For instance, an encryption key used by the CSS may differ from one theater to another, and each theater 13 decrypts data through use of a unique decryption key. In this embodiment, if third parties have acquired the encryption key of the theater 13-1, have also acquired all the DVD-ROMs 15-1, 15-2, . . . to be delivered to the theater 13-2, and all the scene data sets have been sorted correctly by coincidence, the encryption key of the theater 13-2 differs from that of the theater 13-1. Hence, the DVD-ROMs 15-1, 15-2 cannot be decrypted. By and large, prevention of unauthorized viewing or duplication of a movie can be ensured more reliably. As is evident from the foregoing description, in an embodiment also in which a different key is assigned to each of the motion-picture distributors, prevention of unauthorized viewing or duplication of a movie can be ensured by and large more reliably.

The present embodiment has described an example in which the serialization apparatus 51 has set a sorting sequence beforehand. The sorting sequence may be reported to the theaters 13 from the motion-picture distributor 12. For instance, the motion-picture distributor 12 may report information representing a sorting sequence to the theaters 13 through use of communications means such as a facsimile. The operator in the theater 13 may set appropriate sorting procedures by means of actuating the serialization apparatus 51. Alternatively, an algorithm to be used for sorting scene data randomly in the computer system 22 may be correlated with an algorithm to be used for determining sorting procedures employed by the serialization apparatus 51, wherein the first day at which a movie is to be screened is taken as a key factor. The serialization apparatus 51 can acquire appropriate procedures only on or after the first day. In a case where different encryption keys are assigned to the respective theaters 13, an algorithm for sorting scene data randomly in the computer system 22 may be correlated with an algorithm to be used for determining sorting procedures employed by the serialization apparatus 51, wherein the encryption keys are taken as keys.

The length of a scene corresponding to the scene data 42 shown in FIG. 4 can be set. For instance, when data compression rate is a priority, a certain length of time is assigned to respective scenes, thereby improving a compression rate.

The previous embodiment has described that the apparatus 20 encrypts the serial video data 41 after having made the data 41 non-serial. However, the apparatus 20 may render the serial video data 41 non-serial after having encrypted the video data 41, and the apparatus 50 may decrypt the video data 41 after having serialized the non-serial video data 41. In this case, decryption and re-encryption operations to be performed by the serialization apparatus 51 become unnecessary.

The apparatus 50 to be disposed on the playback end of the operation may be provided with a video buffer. Video data may then be read in a correct sequence (or a serial manner) from a plurality of DVD-ROMs while being decrypted, thus producing the serial video data 41.

B: Second Embodiment

A motion picture distribution-and-screening system according to a second embodiment of the present invention will be described with reference to FIGS. 12 through 18. Throughout the drawings, those elements which are the same as the elements shown in FIGS. 1 through 11 are assigned the same reference numerals, and repetition of their explanations is omitted.

B-1: Overall Configuration

Figure 12:
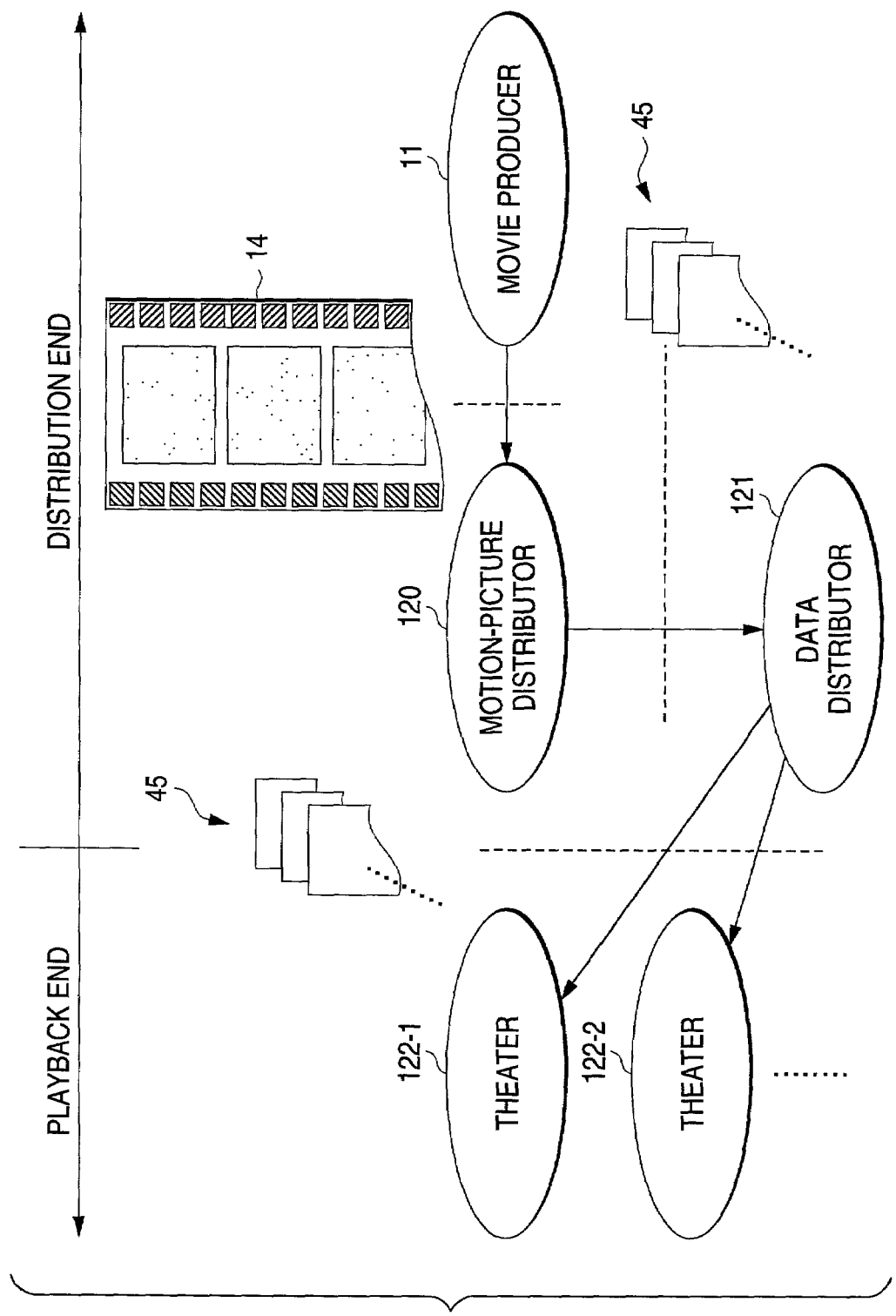
FIG. 12 is a conceptual rendering showing the overall configuration of the motion picture distribution-and-screening system according to a second embodiment of the present invention.

FIG. 12 shows the overall configuration of the motion picture distribution-and-screening system according to the second embodiment. The system shown in FIG. 12 differs from that shown in FIG. 1 in the following three points.

First, encrypted non-serial video data 45 are output from a motion-picture distributor 120 with regard to the master film 14 produced by the movie producer 11. Second, a data distributor 121 having satellite distribution equipment receives the encrypted non-serial video data 45, and the distributor 121 distributes the data via satellite. Third, theaters 122-1, 122-2, . . . , on which a movie of interest is to be screened, receive the thus-distributed encrypted non-serial video data 45 and screen the movie through use of the thus-received video data. In the present embodiment, the data distributor 121 is classified into the group located on the distribution end of the operation.

B-2: Configuration of an Apparatus to be Disposed on the Distribution End of the Operation Referring to FIGS. 13 and 14, next will be described the configuration of an apparatus to be disposed at the motion-picture distributor 120 and at the data distributor 121, which are on the distribution end of the operation.

Figure 13:
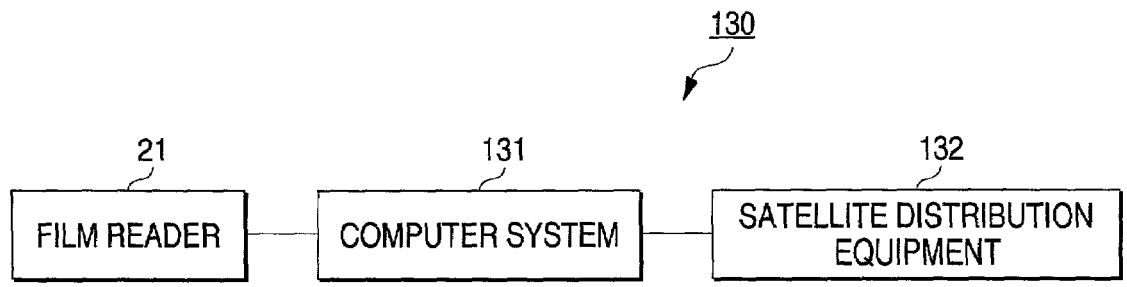
FIG. 13 is a block diagram showing the configuration of an apparatus 130 to be disposed on the distribution end, the apparatus serving as the motion picture distribution-and-screening system.

FIG. 13 is a block diagram showing the configuration of the apparatus 130. As illustrated, the apparatus 130 comprises: a film reader 21; a computer system 131, which produces encrypted non-serial video data 45 through use of a video signal output from the film reader 21, and which transmits the thus-produced video data; and satellite distribution equipment 132, which further encrypts the encrypted non-serial video data 45 transmitted from the computer system 131, and which distributes the thus-encrypted data to the satellites 122-1, 122-2, . . . .

Figure 14:
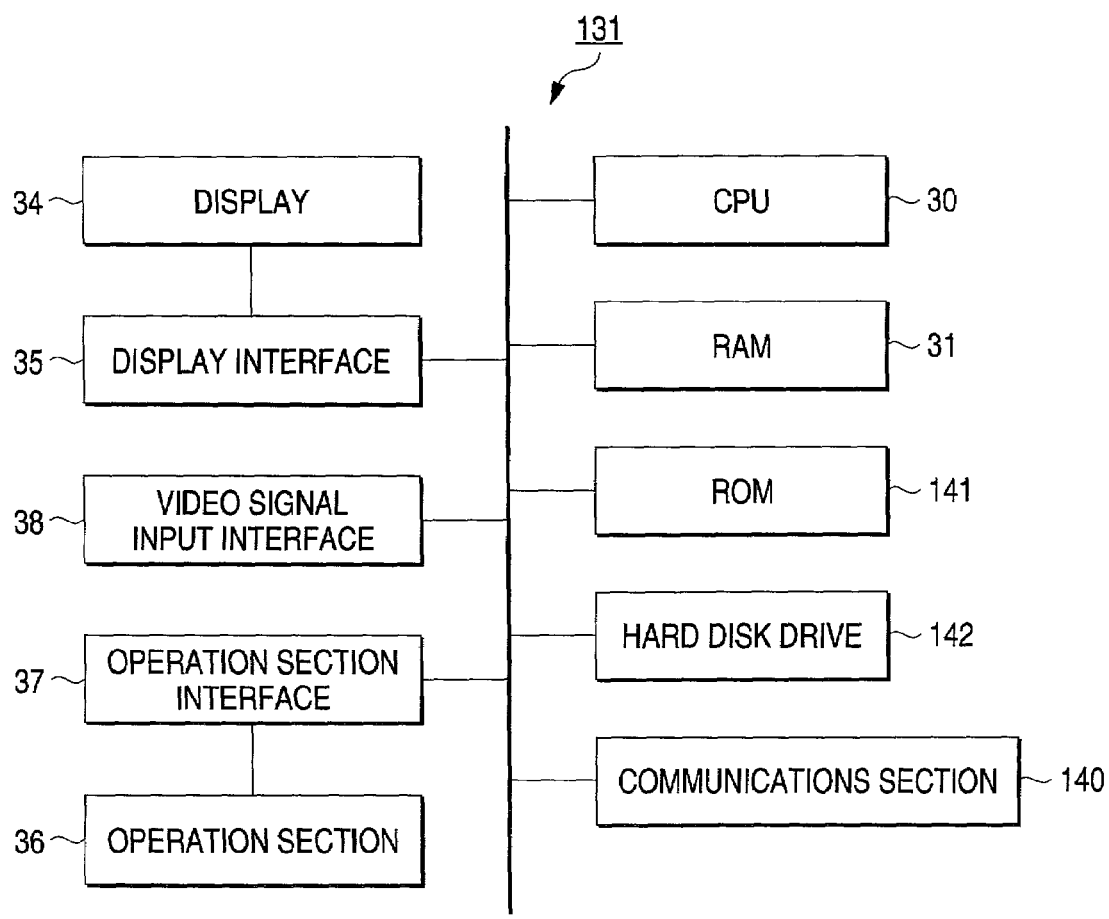
FIG. 14 is a block diagram showing the configuration of a computer system 131 serving as the apparatus 20.

FIG. 14 is a block diagram showing the configuration of the computer system 131. The computer system shown in FIG. 14 differs in configuration from that shown in FIG. 3 in the following three points. First, a communications section 140 is provided in place of the DVD-ROM writer 39, the ROM 32, and the hard disk drive 33, for transmitting the encrypted non-serial video data 45 to the satellite distribution equipment 132. Second, the program to be used for controlling the DVD-ROM writer 39 is deleted from the ROM 32 and the hard disk drive 33. Third, the computer system 131 is provided with ROM 141 and a hard disk drive 142 to which a program to be used for controlling the communications section 140 is added.

In the apparatus 130, as a result of turning on the power (unillustrated), or in accordance with the user instruction entered by way of the operation section 36, the CPU 30 executes a cluster of programs stored in the ROM 141 and on the hard disk drive 142, thereby performing various types of processing. In connection with details of the processing, the apparatus 130 differs from the apparatus 20 in that the encrypted non-serial video data 45 are transmitted to the satellite distribution equipment 132 by way of the communications section 140 without being written into a DVD-ROM. In the present embodiment, the video data assumes, as the final form, the encrypted non-serial video data 45 rather than the DVD-ROMs 15-1, 15-2, shown in FIG. 4.

B-3: Configuration of an Apparatus to be Disposed on the Playback End of the Operation Referring to FIGS. 15 and 16, next will be described the configuration of an apparatus 150 disposed at the theaters 122 on the playback end of the operation.

Figure 15:
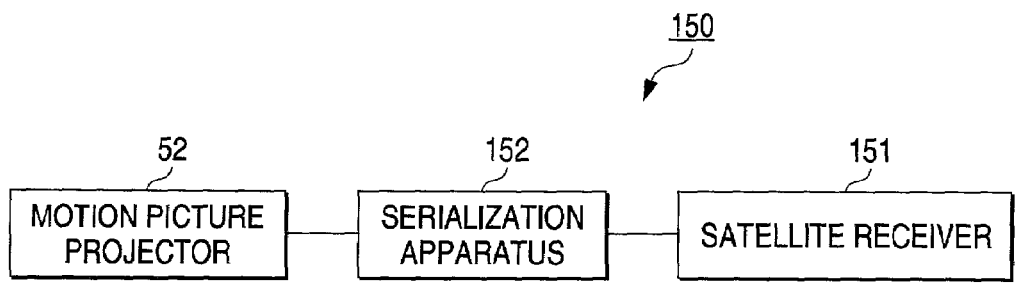
FIG. 15 is a block diagram showing the configuration of an apparatus 150 serving as the motion picture distribution-and-screening system.

FIG. 15 is a block diagram showing the configuration of the apparatus 150. As illustrated, the apparatus 150 comprises: a satellite receiver 151, which receives the data distributed by the satellite distribution equipment 132, and which outputs the thus-received data; a serialization apparatus 152 which receives the data output from the satellite receiver 151, produces encrypted serial video data 80 from the thus-received data, and outputs the thus-produced encrypted serial video data 80; and a motion picture projector 52 for playing back the encrypted serial video data 80.

Figure 16:
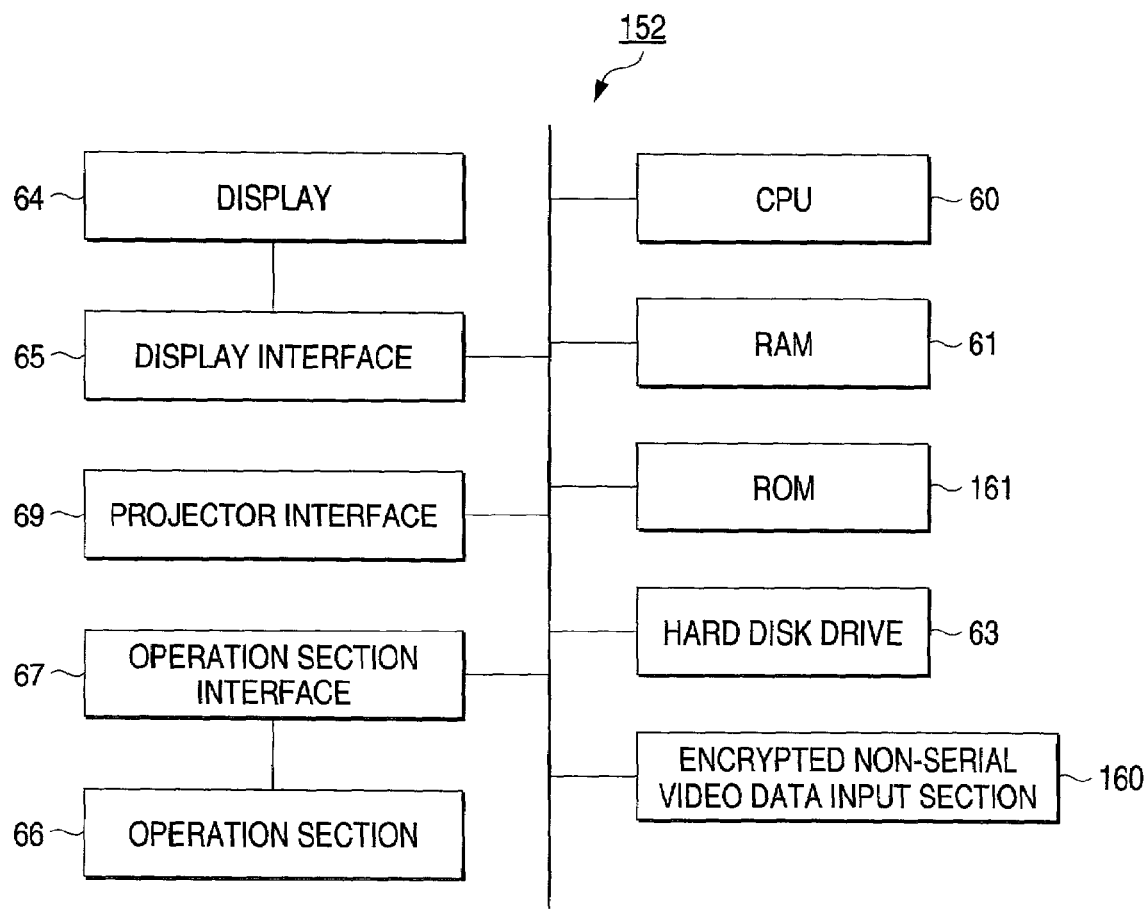
FIG. 16 is a block diagram showing the configuration of a serialization apparatus 152 serving as the apparatus 150.

FIG. 16 is a block diagram showing the configuration of the serialization apparatus 152. The serialization apparatus shown in FIG. 16 differs in configuration from that shown in FIG. 6 in the following three points. First, an encrypted non-serial video data input section 160, provided in place of the DVD-ROM drive 68 and the ROM 62, receives the data output from the satellite receiver 151. Second, the program for controlling the DVD-ROM driver 68 is deleted from the ROM 62. Third, the serialization apparatus 152 is provided with ROM 161 to which is added a program for controlling the satellite receiver 151.

In the serialization apparatus 152, as a result of turning on the power (unillustrated), or in accordance with a user instruction entered by way of the operation section 66 or with the data input by way of the satellite receiver 151, the CPU 60 executes a program stored in the ROM 161, thereby performing various types of processing. In connection with details of the processing, the serialization apparatus 152 differs from the serialization apparatus 51 in that the encrypted non-serial video data 45 are input by way of the encrypted non-serial video data input section 160 without reading the data from a DVD-ROM. In the present embodiment, processing of the encrypted non-serial video data 45 and subsequent processing shown in FIG. 8 are effected.

B-4: Flow of Processes for Distributing and Screening a Movie

Figure 17:
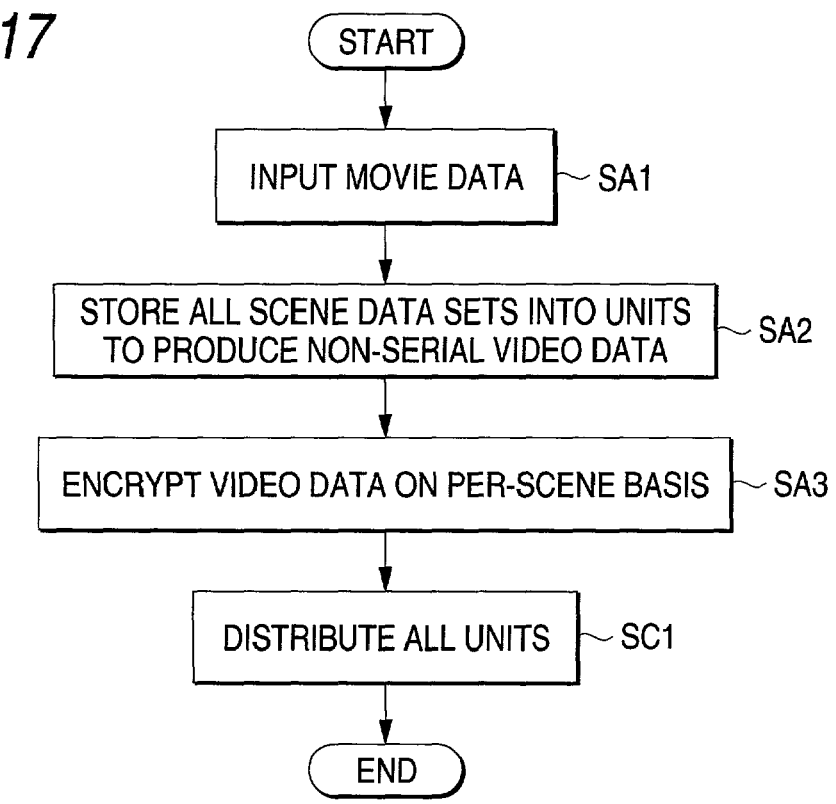
FIG. 17 is a flowchart showing the flow of distributing operation to be effected on the distribution end of the motion picture distribution-and-screening system.
Figure 18:
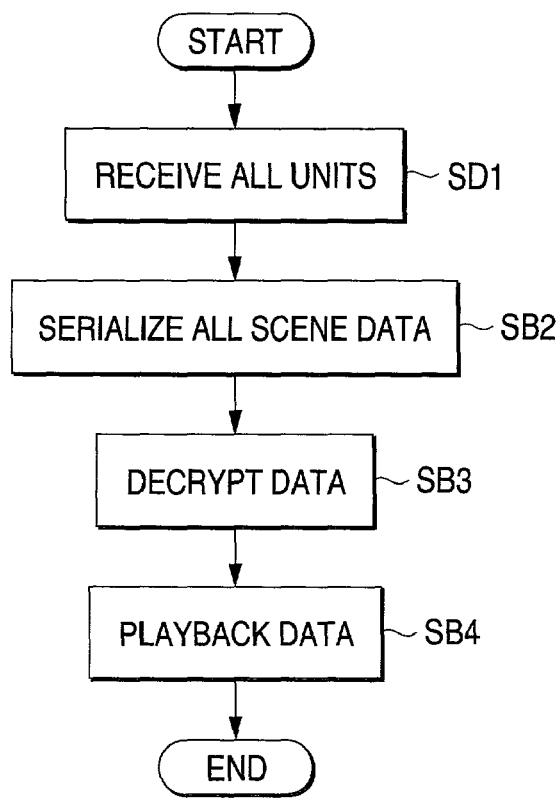
FIG. 18 is a flowchart showing the flow of playback operation to be effected on the playback end of the motion picture distribution-and-screening system.
Figure 19:
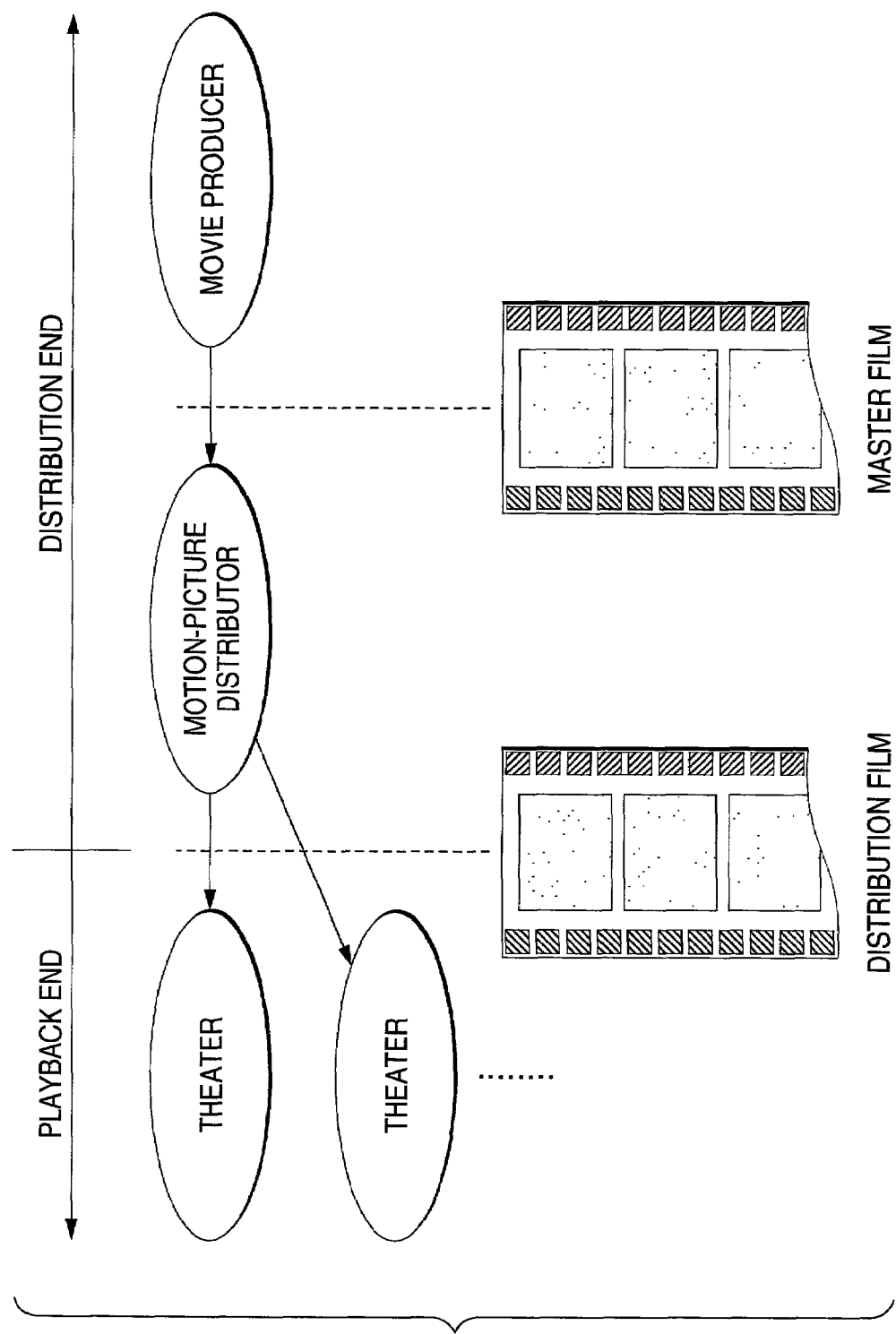
FIG. 19 is a conceptual rendering showing the outlined configuration of a related-art motion picture distribution/screening system.

Referring primarily to FIGS. 17 and 18, next will be described the flow of a processes for distributing and screening a movie on the motion picture distribution-and-screening system of the foregoing construction. The following descriptions are based on the assumption that the power of the film reader 21, that of the computer system 131, that of the satellite distribution equipment 132, that of the motion picture projector 52, that of the satellite receiver 151, and that of the serialization apparatus 152 have already been turned on. Further, the following descriptions are based on the assumption that the serialization apparatus 152 has already sorted the scene data sets 46-1, 46-2, . . . in the correct sequence of projection. Moreover, the satellite receiver 151 of the theater 122 on which a movie is to be screened—has already completed a preparation for performing a decrypting operation through use of the satellite distribution equipment 132.

FIG. 17 is a flowchart showing the flow of a distributing operation to be effected on the distribution end of the operation. The flow of the distribution operation to be effected in the present embodiment is identical with processing pertaining to steps Al through A3 to be effected by the movie distribution-and-screening system according to the first embodiment. The encrypted non-serial video data 45 which have been prepared in the computer system 131 by step SA3 are transmitted to the satellite distribution equipment 132 in a random sequence for each unit 43. The data are further distributed to the theaters 122-1, 122-2, . . . from the satellite distribution equipment 132 (step SC1).

FIG. 18 is a flowchart showing the flow of a playback operation to be effected on the playback end of the operation. As illustrated, the encrypted non-serial video data 45 are input to the serialization apparatus 152 by way of the satellite receiver 151, which is disposed in the theater 122 (step SD1). The encrypted non-serial video data 45 are stored in the hard disk 63 of the serialization apparatus 152. Subsequently, processing, pertaining to steps SB2 through SB4, is carried out in the same manner as in the movie distribution-and-screening system according to the first embodiment. Consequently, a video corresponding to the serial video data 41 is projected from the motion picture projection section 75 of the motion picture projector 52, whereby a movie is screened.

B-5: Supplement

The second embodiment set forth can yield the same advantage as that yielded by the first embodiment. The second embodiment eliminates a necessity for the motion-picture distributor 120 to duplicate media for distribution purposes. Hence, there can be greatly diminished efforts, which would otherwise be required, by the motion-picture distributor 120.

Also, the modifications described in connection with the first embodiment may be applied to the second embodiment. Here, in the second embodiment, the motion picture projector 52 may be integrated with the satellite receiver 151 as well as with the serialization apparatus 152.

The second embodiment has described an example in which the satellite receiver 151 disposed on the playback end has already completed preparations for decrypting data through use of the satellite distribution equipment 132. A decryption key may be reported to the theaters 122 from the motion-picture distributor 120. For instance, the motion-picture distributor 120 reports information representing a decryption key to the theaters 122 by way of communications devices such as a telephone. The operator in each of the theaters 122 may operate the satellite receiver 151 through use of the information, thereby causing the satellite distribution equipment 132 to decrypt the encrypted data.

C: Overall Supplement

As has been described, in the respective embodiments, safe distribution and screening of a movie using digital media can be effected.

In addition, in each of the embodiments, costs incurred by distribution and screening facilities are diminished by adoption of standard specifications such as a DVD-VIDEO (e.g., distribution costs were diminished to about one-hundredth that incurred by the related-art system, and screening facility costs were diminished to about a quarter of that required by the related-art system). Thus, the present invention is not merely a simple replacement of the related-art system using a 35 mm film with a new system. The present invention is expected to create new business models.

For example, related-art movie theaters require a large audience in order to recoup investment for distributing a movie and for screening facilities. Hence, theaters are located on busy streets where large audiences can be expected. In other words, people who do not visit a busy street may be said to be distanced from movies. According to the embodiments of the present invention, costs required for distributing a movie, and those required by screening facilities, can be diminished greatly. Hence, a movie theater can be located in a district other than on a busy street. The system according to the present invention can give people who have been shunned by the related-art system a chance of appreciating a movie in the theater.

A significant curtailment of costs required for distributing a film, or costs incurred by facilities of a movie theater, may promote diversification of the form of a theater. For example, there may be prepared a private-style movie theater numbering 20 to 50 seats, and a waiting service may be offered. Viewing a movie in such a theater may attract people who avoid visiting movie theaters because they cannot feel relaxed in an ordinary movie theater. If such a movie theater is embodied by way of a related-art system, costs which users must bear become unreasonably high. However, the embodiments of the present invention enable realization of such a movie theater.

The embodiments of the present invention are effective for improving profitability of existing movie theaters as well as for creating new business models. For example, in a cinema complex comprised of a large-size theater numbering 200 to 500 seats, and a plurality of small-size theaters each numbering 50 to 100 seats, the movie distribution-andscreening system described in connection with the above embodiments is employed for the small-size theaters, whereas a related-art system using a 35 mm film is employed for the large-size theater. As a result, improvements in the profitability of the overall cinema complex can be expected.

Although the embodiments have described a case in which the present invention is applied to distribution and screening of a movie, the present invention is not limited to such a case. The present invention can be applied to various systems which distribute and play back videos that are protected.

D: Advantageous effects of the Invention

As has been described above, according to the present invention, there are distributed video data in which a plurality of unit video data sets are not arranged in time series. Even if the video data are stolen by third parties during distribution, unauthorized duplication or playback of the video data can be prevented. In other words, safe distribution and playback of video data (e.g., movie data), which must be distributed safely, can be effected.

In a case where video data are distributed and delivered in the form of a plurality of computer readable media, if any one of the computer readable media is stolen by third parties, unauthorized playback and duplication of video data can be prevented. Thus, safety of video data can be improved.

Further, so long as video data are distributed in an encrypted form, safety of the video data can be improved further.

In a case where video data to be distributed to the playback end of the operation are distributed while being encrypted according to an encryption method assigned to the playback end, if any one of the video data sets is used illegally by third parties, safety of the remaining video data sets supplied to the playback end can be ensured.

Further, if outputting of decrypted video data to the outside is prohibited on the playback end, safety of the video data can be improved to a much greater extent.

Finally, as has been described, the present invention enables safe and low-cost distribution of movie data.

The present invention is not limited to the specific above-described embodiments. It is contemplated that numerous modifications may be made to the embodiments of the present invention without departing from the spirit and scope of the invention as defined in the following claims.

What is claimed is:

1. A business method, for distributing a movie from a movie distribution end to a public movie theater in which the movie is to be screened, comprising:

preparing sets of DVD-ROMs on the movie distribution end by dividing scene data of a master movie film produced by a movie producer into non-serial video data in which scene data sets are randomly distributed to units of scenes and randomly writing the units of scenes into each set of the DVD-ROMs as content, said each set of DVD-ROMs comprising a plurality of DVD-ROMs randomly written with a complete copy of the scene data of the master movie film without marking a time sequence thereon;

physically distributing one set of said DVD-ROMs to the theater;

setting the distributed set of the DVD-ROMs to an apparatus at the theater;

reading out content stored in the set of the DVD-ROMs;

storing all of the read-out contents of the set of the DVD-ROMs in a storage of the apparatus;

producing video data from the contents stored in the storage of the apparatus after completion of the storing by reading out and sorting the units of scenes in a correct sequence;

screening the movie in the movie theater through use of the produced video data, wherein in the preparing step, the units of scenes are encrypted and written into each set of the DVD-ROMs, and wherein different encryption methods are used for sets of the DVD-ROMs physically distributed to different theaters.

2. An apparatus, to be disposed on the distribution end for implementing the method according to claim 1, the apparatus comprising:

a film reading device which reads a master movie film, produced by a movie producer, on a per-scene basis, and which outputs an analog video signal pertaining to respective scenes on a per-scene basis; and a computer which prepares sets of DVD-ROMs, each set of DVD-ROMs comprising a plurality of DVD-ROMs, wherein said sets of DVD-ROMs are prepared by use of said video signal output from said film reading device.

3. The business method according to claim 1, wherein in the preparing step, the content is encrypted and written into each set of the DVD-ROMs, and when storing the read-out content, the content is decrypted.

4. The business method according to claim 1, wherein the set of said DVD-ROMs are distributed to the theater separately.

5. The business method according to claim 1, wherein when storing the read-out units of scenes, the units of scenes are stored encrypted.

6. The business method according claim 1, wherein when storing the read-out units of scenes, the units of scenes are decrypted and then stored.

* * * * *